United States Patent
Kwon et al.

(10) Patent No.: US 8,213,335 B2
(45) Date of Patent: Jul. 3, 2012

(54) COMMUNICATION RESOURCE ALLOCATION METHOD OF BASE STATION

(75) Inventors: Jae-Kyun Kwon, Daejeon (KR); Jae-Young Ahn, Daejeon (KR); Hyo-Jin Lee, Daejeon (KR); Hee-Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1116 days.

(21) Appl. No.: 12/064,808

(22) PCT Filed: Aug. 23, 2006

(86) PCT No.: PCT/KR2006/003310
§ 371 (c)(1),
(2), (4) Date: Feb. 25, 2008

(87) PCT Pub. No.: WO2007/024096
PCT Pub. Date: Mar. 1, 2007

(65) Prior Publication Data
US 2008/0225752 A1    Sep. 18, 2008

(30) Foreign Application Priority Data
Aug. 24, 2005  (KR) .................. 10-2005-0077801
Jun. 7, 2006   (KR) .................. 10-2006-0050826

(51) Int. Cl.
*H04L 12/28*    (2006.01)
(52) U.S. Cl. .............. 370/254; 370/236.1; 370/328; 370/329; 455/440; 455/443; 455/444; 455/447; 455/456.1
(58) Field of Classification Search ............. 370/236.1, 370/328, 329; 455/440, 443, 444, 447, 456.1
See application file for complete search history.

(56) References Cited

U.S. PATENT DOCUMENTS
4,144,496 A  * 3/1979 Cunningham et al. ........ 455/447
(Continued)

FOREIGN PATENT DOCUMENTS
EP    0 929 202    7/1999
(Continued)

OTHER PUBLICATIONS

"OFDM with interference control for improved HSDPA coverage", 3GPP TSG RAN WG1 #37 May 10-14, 2004, pp. 1-11.
(Continued)

*Primary Examiner* — Ian N Moore
*Assistant Examiner* — Brian T Le
(74) *Attorney, Agent, or Firm* — Kile Park Goekjian Reed & McManus PLLC

(57) ABSTRACT

A communication resource allocation method for solving resource request imbalance content in a cell is provided. Considering a propagation environment, the base station allocates a whispering resource to a whispering area, the whispering resource being one part of the communication resource and the whispering area being a peripheral area of the first base station, and allocates a speaking resource to a speaking area, the speaking resource being other parts of the communication resource and the speaking area being a border area of a cell. When the resource request of the whispering area is increased, the base station further allocates a part of the speaking resource to the whispering area or increases a ratio of the whispering resource. When the resource request of the speaking area is increased, the base station controls a threshold value for identifying the whispering and speaking areas or increases a ratio of the speaking resource.

5 Claims, 11 Drawing Sheets

U.S. PATENT DOCUMENTS

| | | | |
|---|---|---|---|
| 5,844,894 A * | 12/1998 | Dent | 370/330 |
| 6,078,815 A | 6/2000 | Edwards | |
| 6,351,654 B1 * | 2/2002 | Huang et al. | 455/562.1 |
| 6,496,700 B1 * | 12/2002 | Chawla et al. | 455/435.2 |
| 6,498,934 B1 * | 12/2002 | Muller | 455/450 |
| 2003/0125031 A1 * | 7/2003 | Sung Lim et al. | 455/447 |
| 2003/0190918 A1 * | 10/2003 | Frieder et al. | 455/450 |
| 2004/0097223 A1 * | 5/2004 | Bellec et al. | 455/422.1 |
| 2005/0267677 A1 * | 12/2005 | Poykko et al. | 701/207 |
| 2007/0249361 A1 * | 10/2007 | Klang et al. | 455/452.2 |
| 2009/0047973 A1 * | 2/2009 | MacNaughtan et al. | 455/456.1 |

FOREIGN PATENT DOCUMENTS

| | | |
|---|---|---|
| KR | 1998-045024 | 9/1998 |
| KR | 10-2005-0023702 | 3/2005 |
| KR | 10-2005-0048261 | 5/2005 |
| KR | 10-2005-0115077 | 12/2005 |
| KR | 10-2006-0064459 | 6/2006 |
| WO | WO 97/32441 | 9/1997 |

OTHER PUBLICATIONS

"Interference mitigation—Considerations and Results on Frequency Reuse", TSG-RAN WG1 Ad Hoc on LTE, Jun. 20-21, 2005, pp. 1-5.

"Inter-Cell interference management in practical" 3GPP TSG RAN WG1 Meeting #42, Aug. 29-Sep. 2, 2005, pp. 1-6.

K. Hamidian et al., Performance Analysis of a CDMA/FDMA Cellular Communication System with Cell Splitting, 1997, pp. 545-550.

Won S. Kim et al., Enhanced Capacity in CDMA Systems with Alternate Frequency Planning, 1998, pp. 973-978.

International Search Report—PCT/KR2006/003310 dated Feb. 18, 2008.

Written Opinion—PCT/KR2006/003310 dated Feb. 18, 2008.

* cited by examiner

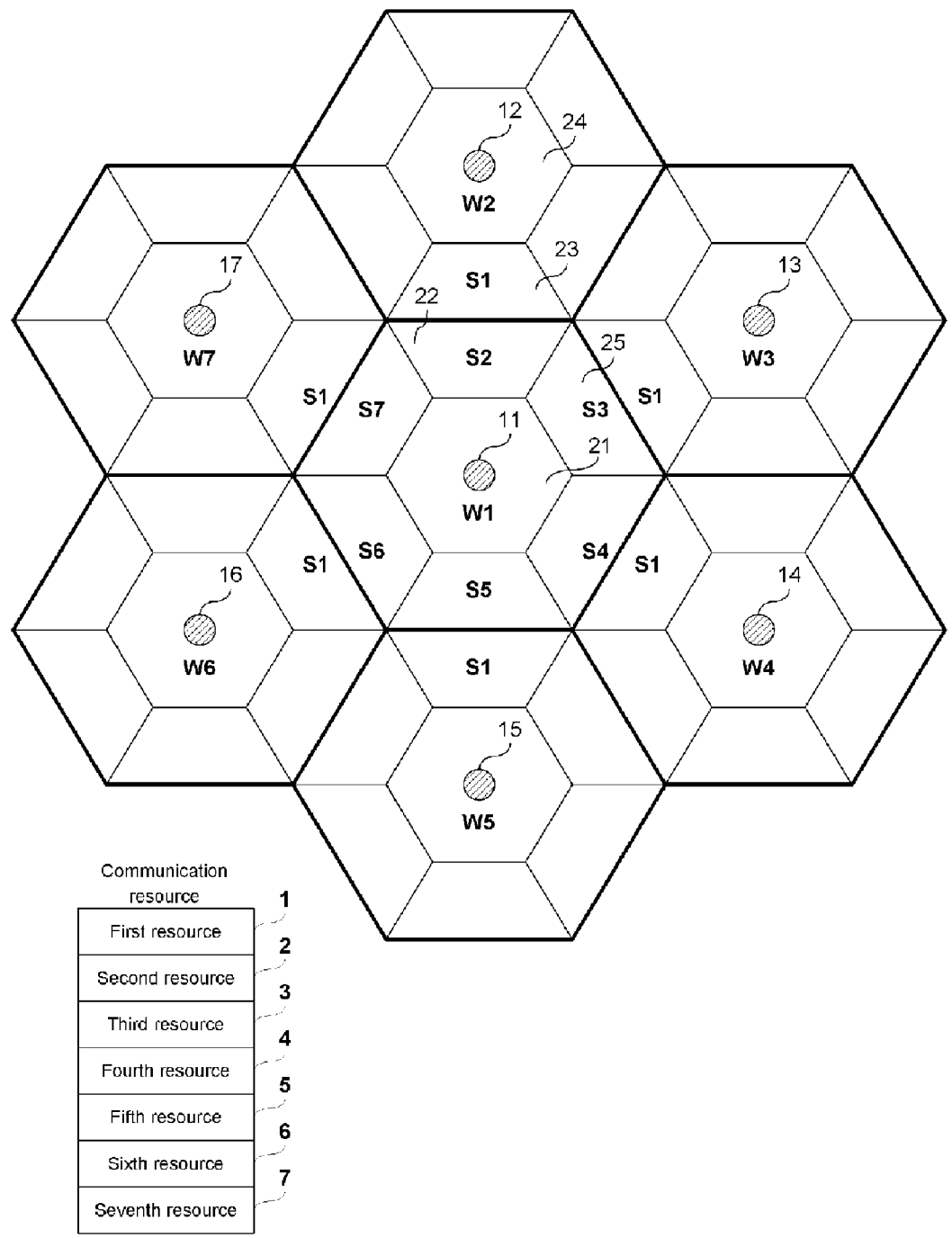
[Fig. 1]

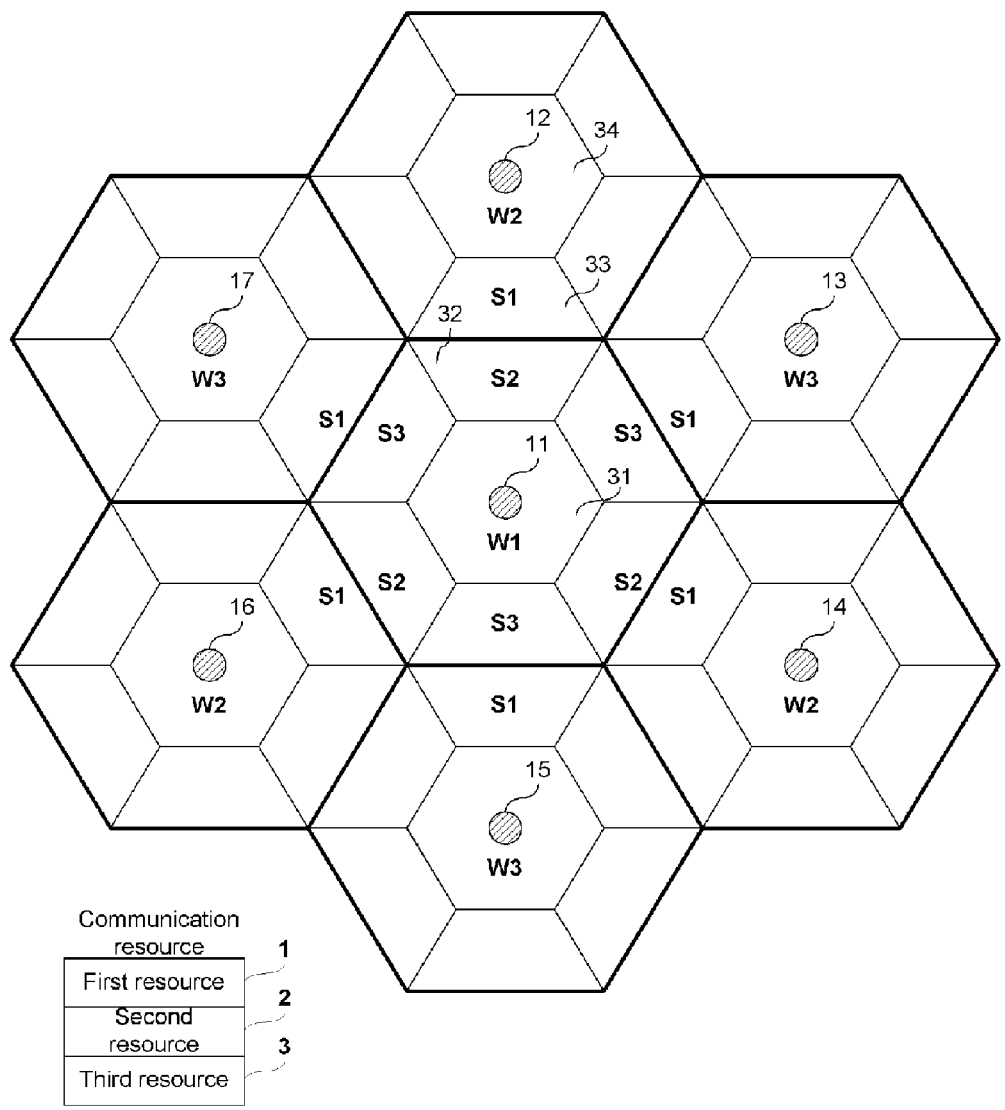
[Fig. 2]

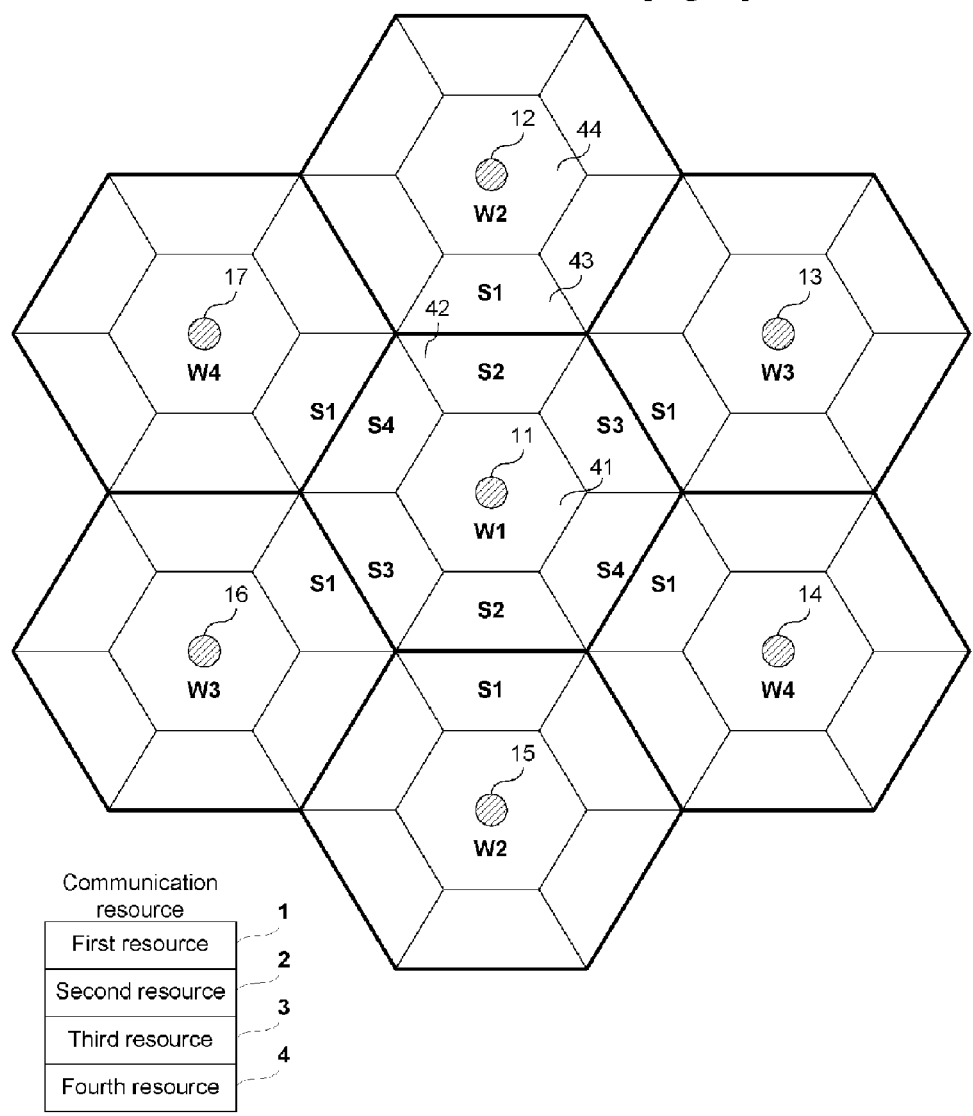
[Fig. 3]

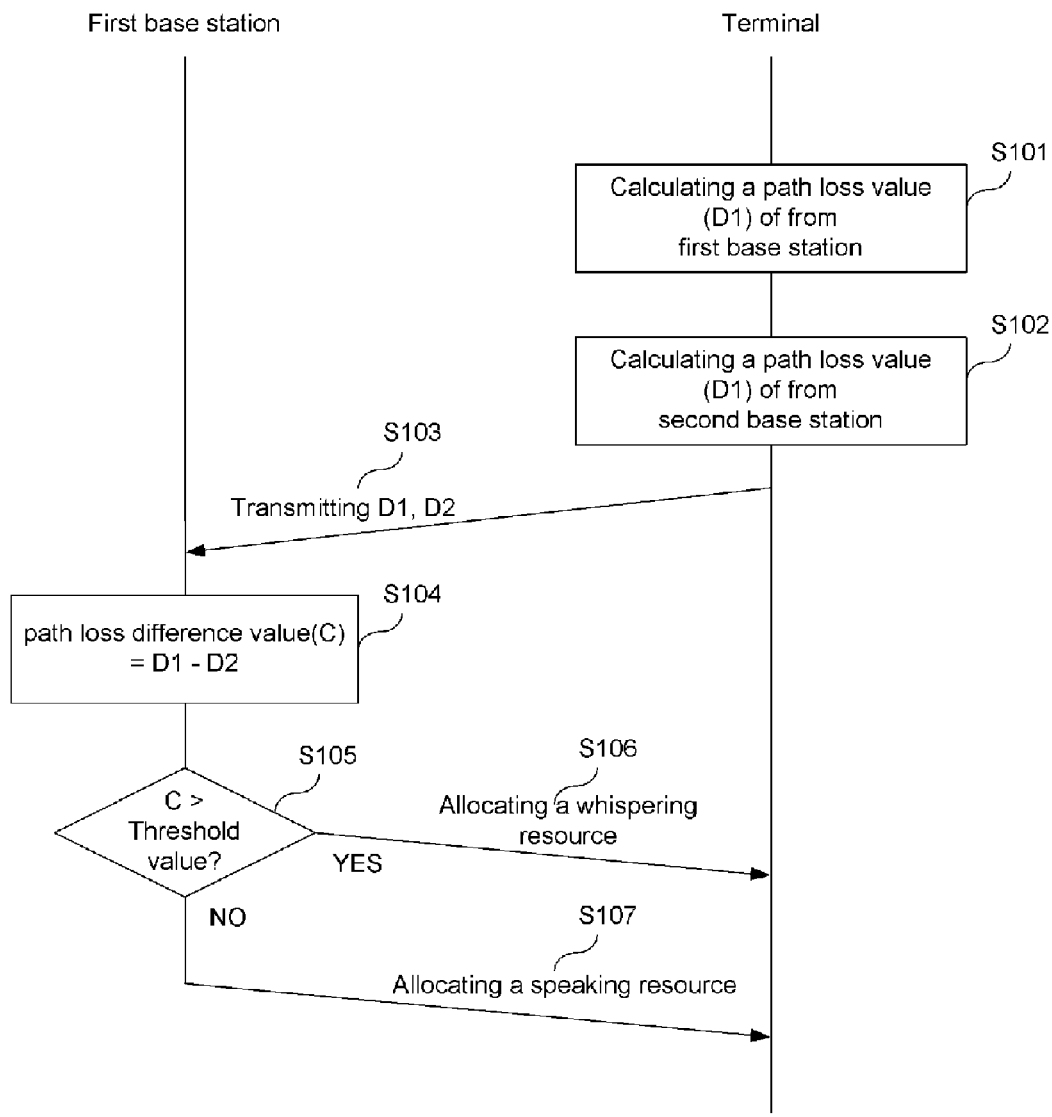
[Fig. 4]

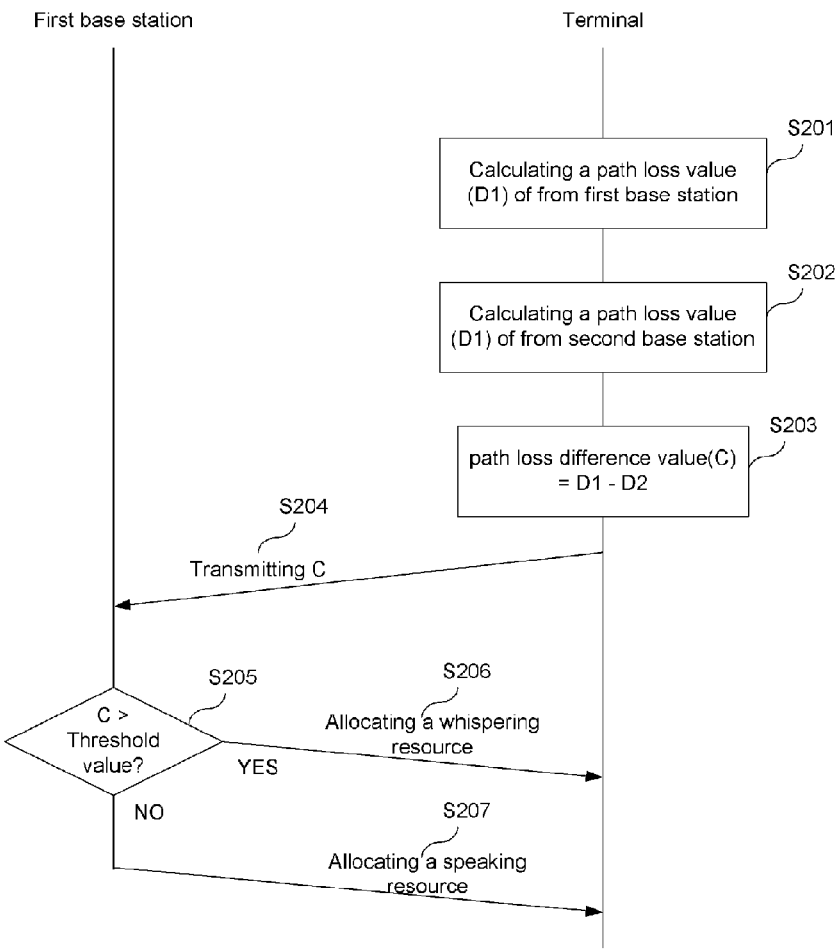
[Fig. 5]
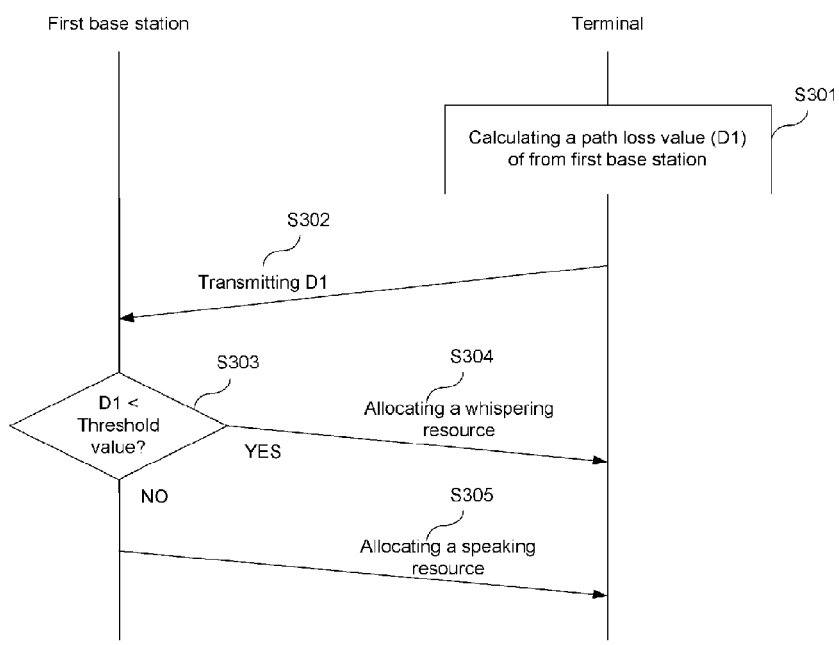
[Fig. 6]

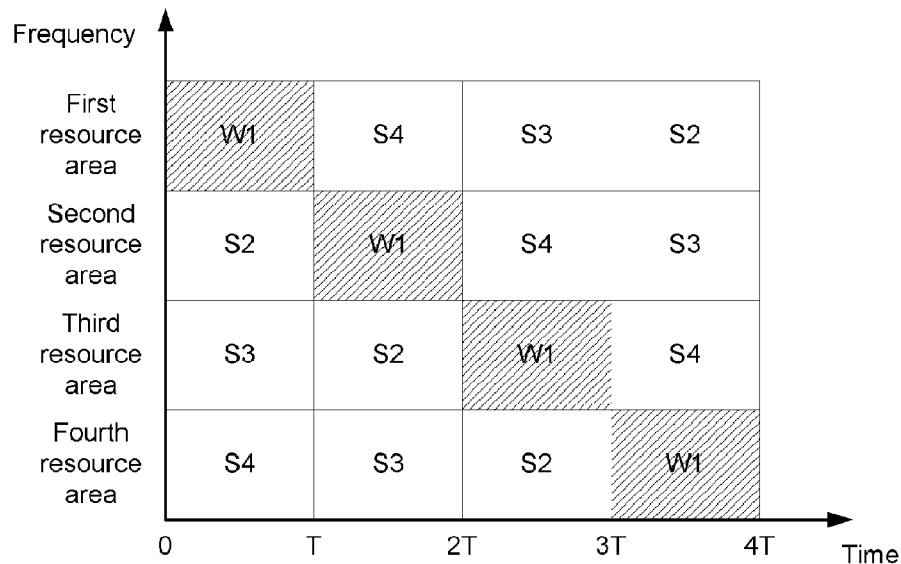
[Fig. 7]
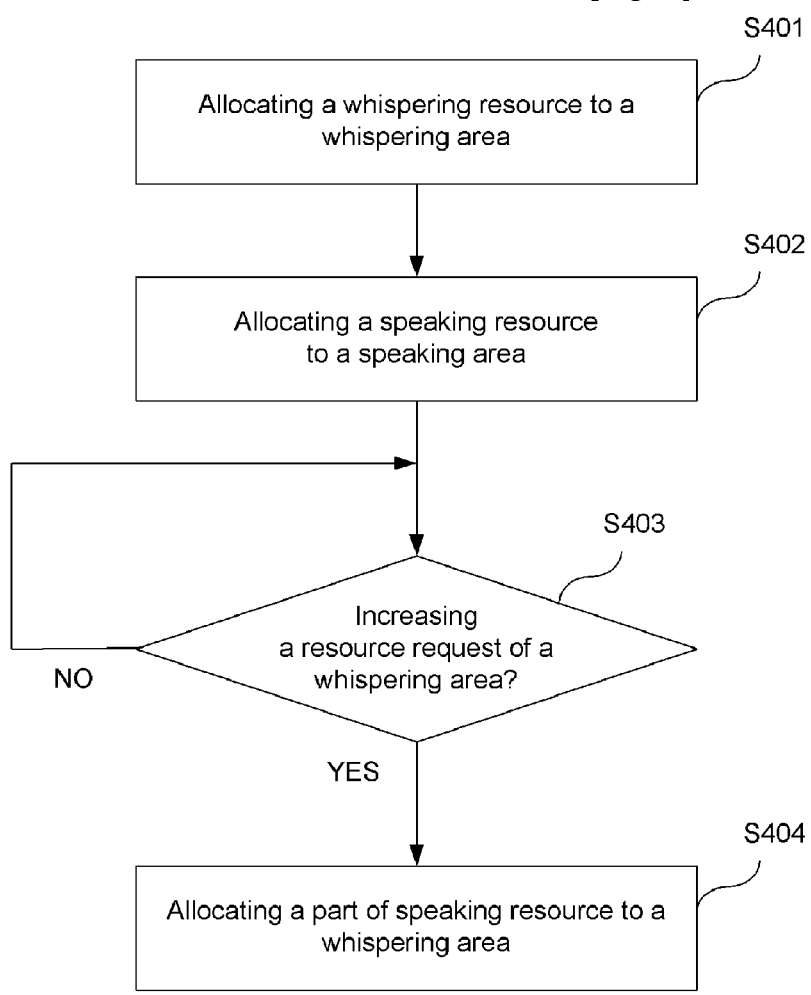
[Fig. 8]

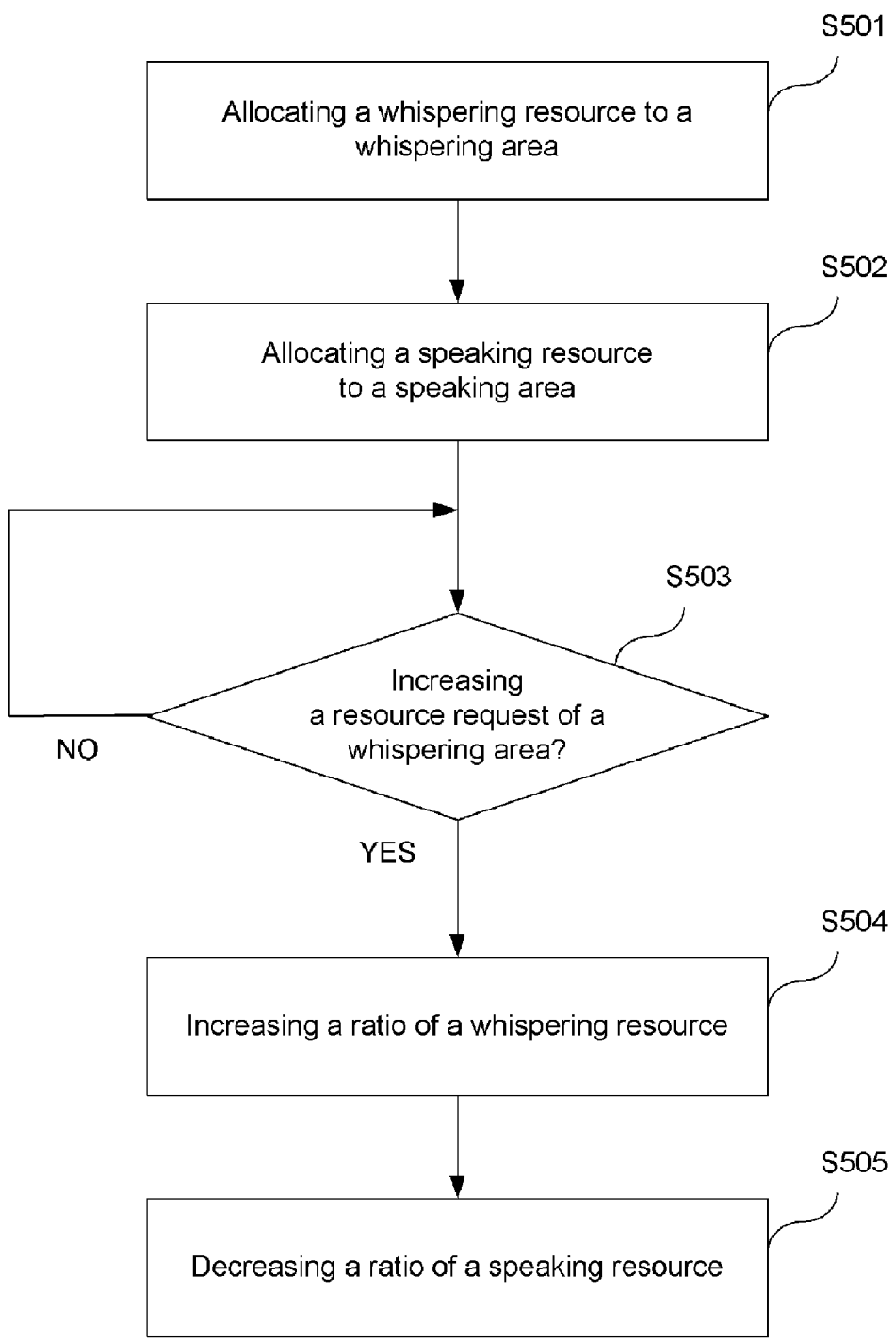

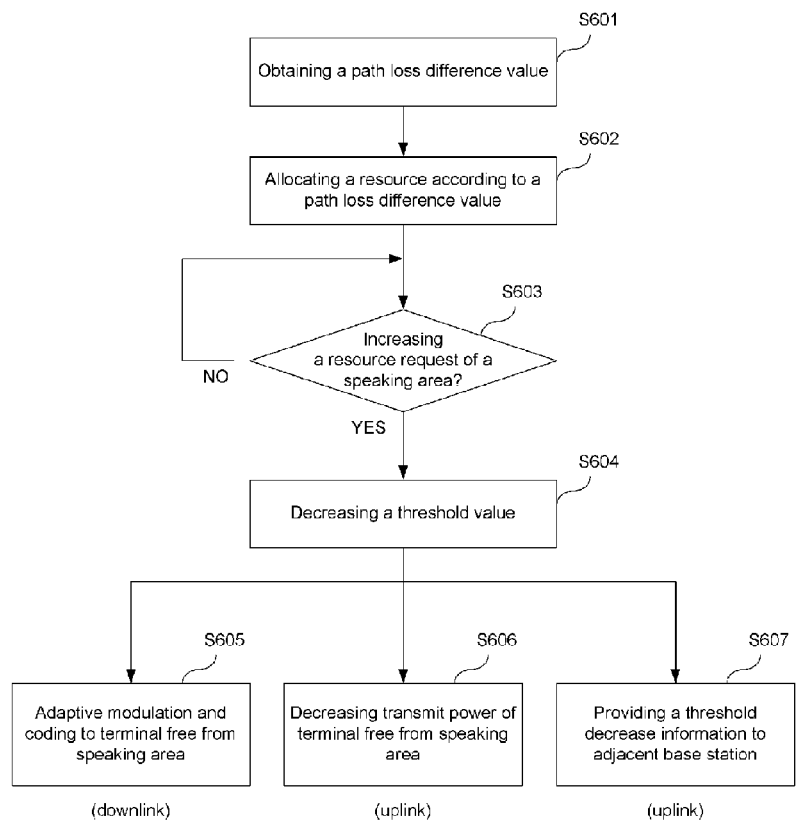
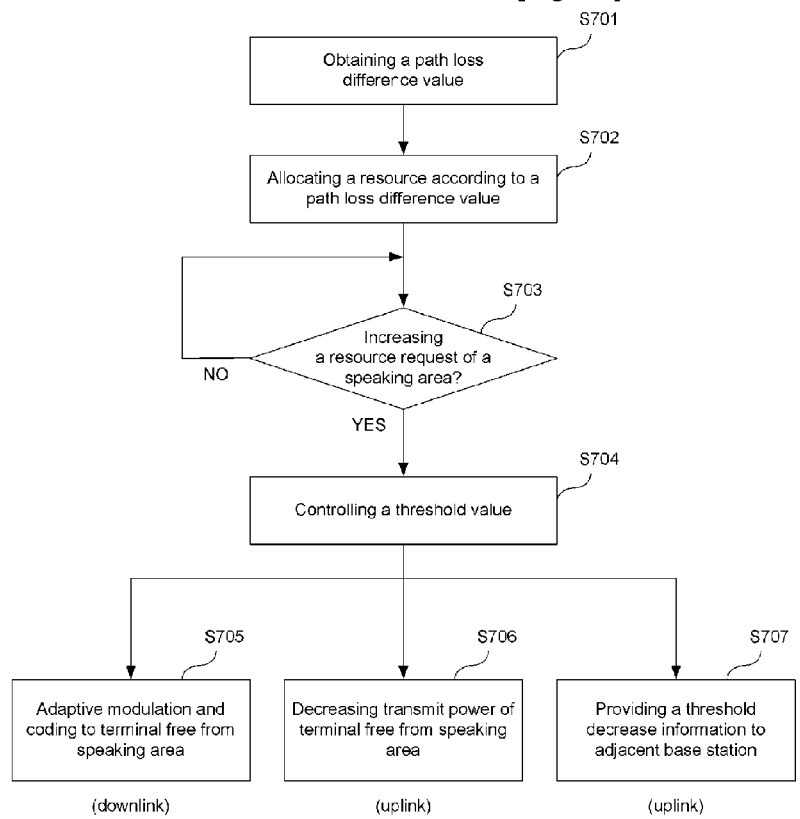

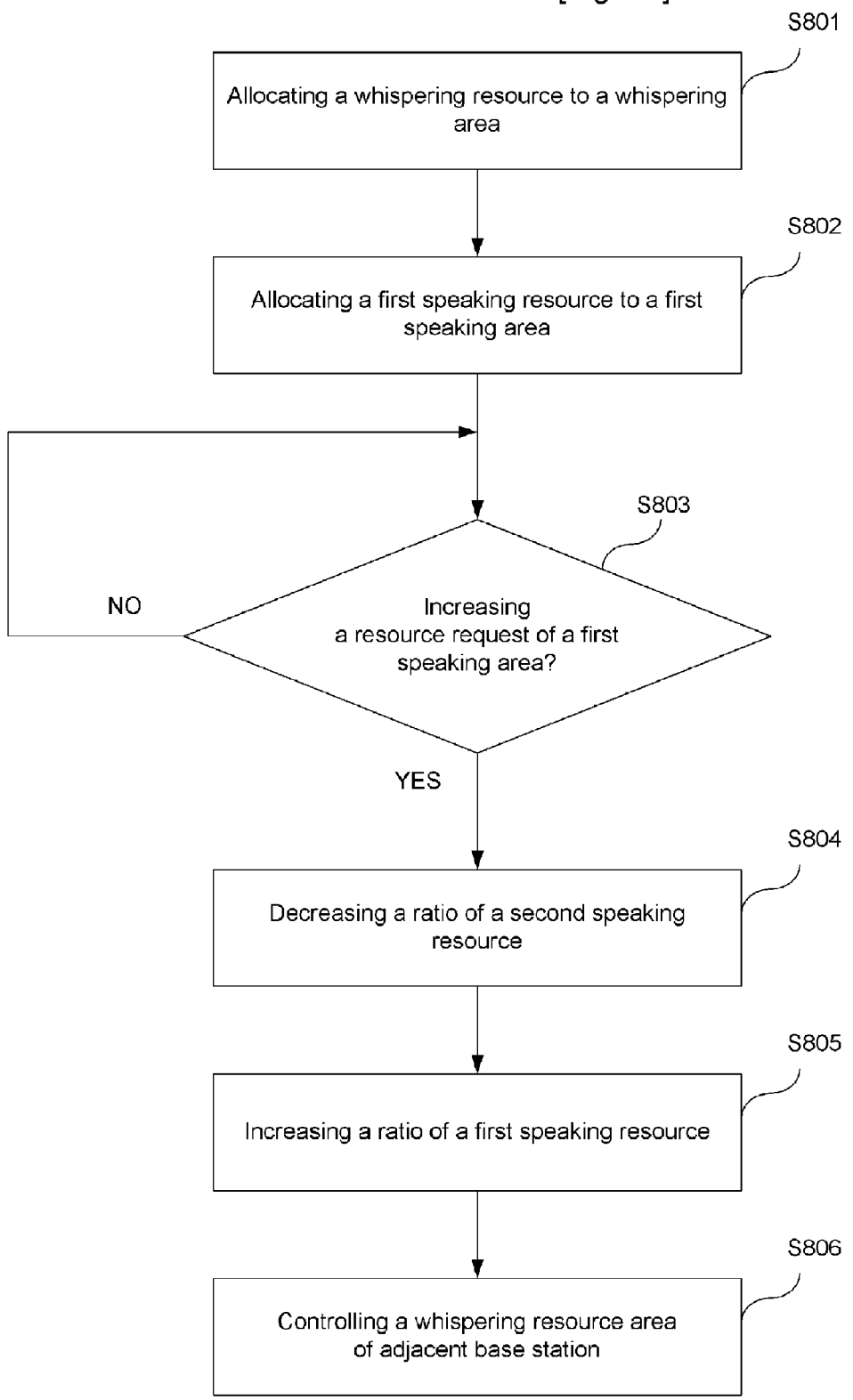

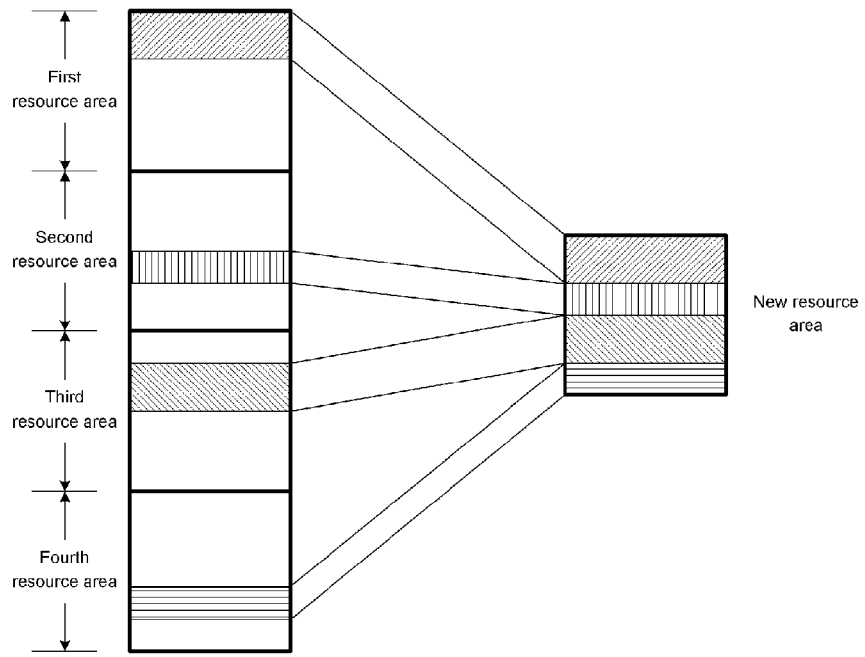
[Fig. 13]
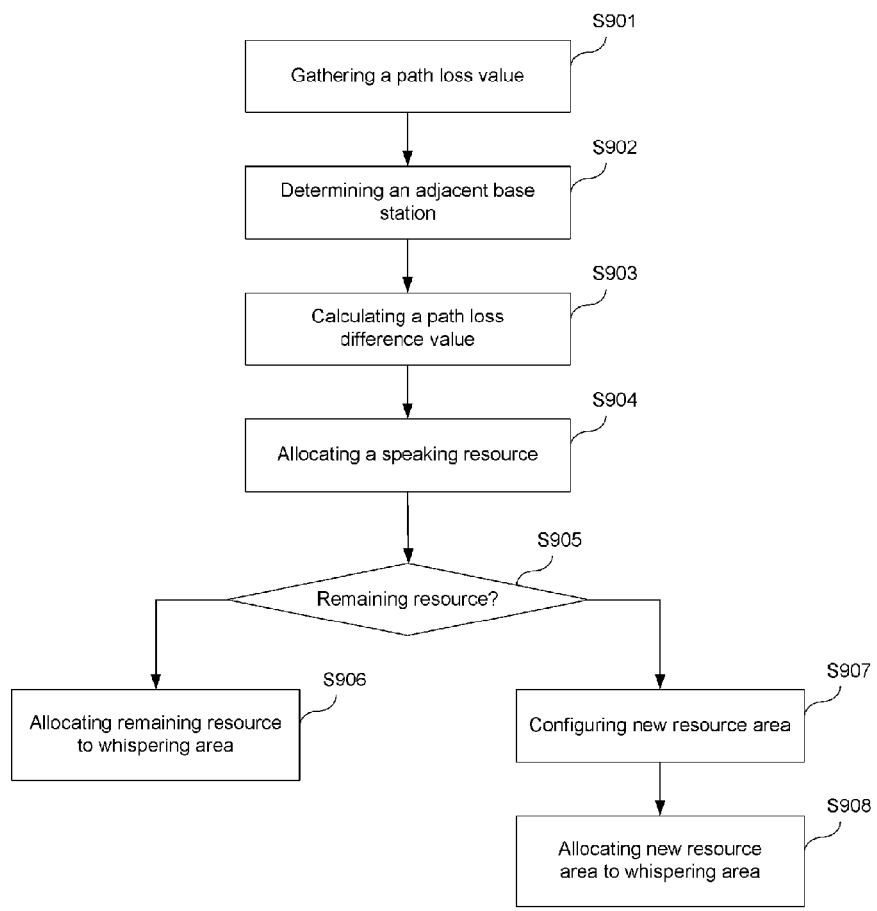
[Fig. 14]

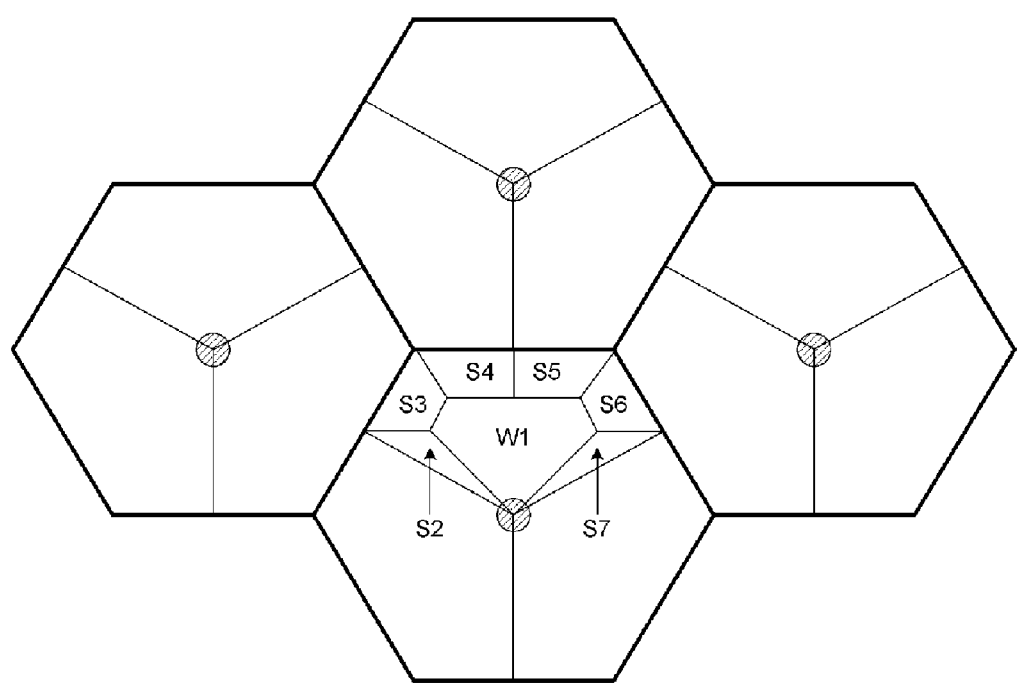
[Fig. 15]

COMMUNICATION RESOURCE ALLOCATION METHOD OF BASE STATION

TECHNICAL FIELD

The present invention relates a communication resource allocation method of a base station.

BACKGROUND ART

In order to avoid interference between adjacent cells, a conventional FDMA or TDMA-based cellular system may obtain a significant signal to interference ratio when the adjacent cells use no common resource. However, when the adjacent cells use no common resource, the frequency reuse efficiency is decreased. The conventional cellular system has a primary aim to provide a voice service of which a data rate is practically constant. Accordingly, it is effective for the cellular system to increase the number of available channels having the significant signal to interference ratio by means of power control so as to have increased system capability. Accordingly, a CDMA-based voice system that largely increases the frequency reuse efficiency has spread. The CDMA-based voice system allows a large of channels to have appropriate interference by decreasing a range of fluctuation of the respective channel interference amount through interference averaging.

However, as a communication service is converted from a voice service of a constant data rate to a packet service of a changeable data rate, it is known that it is not optimal to maintain the appropriate interference by the interference averaging. Also, as orthogonal frequency division multiplexing (OFDM) and orthogonal frequency division multiplexing access (OFDMA) technologies in which it is easy to avoid interference have been developed in cellular areas, an interference processing problem of adjacent cells has again occurred.

In order to solve the interference processing problem of the adjacent cells in the OFDM/OFDMA-based cellular environment, a method for averaging the interference by a frequency hopping method has been developed. According to this method, the respective base stations average the interferences of the adjacent cells by using different hopping patterns in every cell.

In order to solve the interference processing problem of the adjacent cells in the OFDM/OFDMA-based cellular environment, another method for averaging interferences by the frequency hopping is disclosed in Korean Patent Laid-Open Publication No. 2005-0048261 ("A resource spatial vision, a physical channel allocation, and a power allocation method in orthogonal frequency division multiplexing access (OFDMA)-based cellular system, and a frequency reuse efficiency using the same", ETRI, 2005.5.24.). In an exemplary embodiment of this method, all cells are divided into three frequency reuse patterns, and one resource space is divided into three resource sub-spaces. In order to have less effect on the adjacent cells, the respective cells allow the terminal to perform high-power communication by using one of the three resource sub-spaces and to perform low-power communication by others thereof. That is, while a cell-border terminal of a bad channel state communicates as a frequency reuse coefficient 3 using ⅓ of the entire resource, a base station?near terminal of a good channel state communicates without having a large amount of interference on the adjacent cells.

A method for increasing a frequency reuse coefficient for the cell-border terminal was disclosed by Siemens in the 3GPP conference (R1-050599, Siemens, "Interference mitigation considerations and results on frequency reuse," 3GPP RAN WG1 Ad Hoc on LTE, Sophia Antipolis, France, June 2005). According to this method, inter-cell terminals commonly use some resources, and the cell-border terminal equally divides other resources into 3 and uses one thereof. However, this method is not effective with regard to resource efficiency.

Particularly, according to the communication resource allocation method of the base station described above, the base station continuously allocates some specified communication resource to the terminal, and accordingly the terminal have a loss of a diversity gain. Also, the communication resource allocation method described above may not solve inter-cell resource request imbalance content.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a communication resource allocation method having advantages of obtaining a maximum diversity gain and solving resource request imbalance content in a cell.

Technical Solution

An exemplary embodiment of the present invention provides a communication resource allocation method in which a first base station allocates a communication resource. The communication resource allocation method includes allocating a whispering resource to a whispering area, the whispering area being a peripheral area of the first base station and the whispering resource having a resource area changed in the communication resource according to a lapse of time; and allocating a resource corresponding to a whispering resource of a second base station to a speaking area, the speaking area being included in the first base station and being a border area between the first and second base stations.

Another embodiment of the present invention provides a communication resource allocation method in which a first base station allocates a communication resource.

The communication resource allocation method includes allocating a whispering resource to a whispering area, the whispering resource being a part of the communication resource and the whispering area being a peripheral area of the first base station; allocating a speaking resource corresponding to a whispering resource of a second base station to a speaking area, the speaking area being included in the first base station and being a border area between the first and second base stations; and further allocating a part of the speaking resource to the whispering area when the request resource of the whispering area is greater than the allocated whispering resource of the whispering area.

Yet another embodiment of the present invention provides a communication resource allocation method in which a first base station allocates a communication resource. The communication resource allocation method includes allocating a whispering resource to a whispering area, the whispering resource being a part of the communication resource and the whispering area being a peripheral area of the first base station; allocating a speaking resource corresponding to a whispering resource of a second base station to a speaking area, the speaking area being included in the first base station and being a border area between the first and second base stations; and increasing a ratio of the allocated whispering resource of the whispering area when the resource request of the whispering area is increased.

Yet another embodiment of the present invention provides a communication resource allocation method in which a first base station allocates a communication resource. The communication resource allocation method includes obtaining a path loss difference value, the path loss difference value being a difference between the first and second path loss values respectively between the first base station and the terminal and between the second base station and the terminal; allocating a first resource to a whispering area in which the path loss difference value is greater than a predetermined threshold value, the first resource being a part of the communication resource; allocating a second resource to a speaking area in which the path loss difference value is less than the predetermined threshold value, the second resource being a whispering resource of the second base station; and decreasing the threshold value when the resource request of the speaking area is increased.

Yet another embodiment of the present invention provides a communication resource allocation method in which a first base station allocates a communication resource. The communication resource allocation method includes obtaining a first path loss difference value, the first path loss difference value being a difference between the first and second path loss values respectively between the first base station and the terminal and between the second base station and the terminal; obtaining a second path loss difference value, the second path loss difference value being a difference between the first path loss value and a third path loss value between a third base station and the terminal; obtaining a third path loss difference value, the third path loss difference value being a difference between the second and third path loss values; allocating a first resource to a whispering area in which the first path loss difference value is greater than a first threshold value and the second path loss difference value is greater than a second threshold value, the first resource being a part of the communication resource; allocating a first speaking resource to a first speaking area in which the first path loss difference value is less than the first threshold value and the third path loss difference value is less than the third threshold value, the first speaking resource being a whispering resource of the second base station; and allocating a second speaking resource to a second speaking area in which the second path loss difference value is less than the second threshold value and the third path loss difference value is less than the third threshold value, the second speaking resource being a whispering resource of the third base station.

Yet another embodiment of the present invention provides a communication resource allocation method in which a first base station allocates a communication resource. The communication resource allocation method includes allocating a whispering resource to a whispering area, the whispering resource being a part of the communication resource and the whispering area being a peripheral area of the first base station; allocating a speaking resource corresponding to a whispering resource of a second base station to a speaking area, the speaking area being included in the first base station and being a border area between the first and second base stations; decreasing a ratio of a second speaking resource corresponding to the whispering resource of the third base station when the resource request of the speaking area is increased; and increasing the ratio of the first speaking resource by the decrease of the ratio of the second speaking resource.

Yet another embodiment of the present invention provides a communication resource allocation method in which a first base station allocates a communication resource. The communication resource allocation method includes the first base station receiving path loss information between at least one base station and a terminal; determining an adjacent base station through the path loss information; obtaining a path loss difference value, the path loss difference value being a difference between the first and second path loss values respectively between the first base station and the terminal and between the second base station and the terminal; allocating a first resource to a speaking area in which the path loss difference value is less than a threshold value, the first resource corresponding to the whispering resource of the adjacent base station among the communication resource; configuring a second resource by gathering parts of communication resources corresponding to the whispering resource of the two or more adjacent base stations when there is no resource excluding the whispering resource of the adjacent base station among the communication resource; and allocating the second resource to the whispering area in which the path loss difference value is greater than a threshold value.

BRIEF DESCRIPTION OF THE DRAWINGS

FIG. 1 is a schematic view of a cell having an allocated communication resource according to an exemplary embodiment of the present invention.

FIG. 2 is a schematic view of a cell having an allocated communication resource according to another exemplary embodiment of the present invention.

FIG. 3 is a schematic view of a cell having an allocated communication resource according to another exemplary embodiment of the present invention.

FIG. 4 is a flowchart showing a terminal-position determination method according to an exemplary embodiment of the present invention.

FIG. 5 is a flowchart showing a terminal-position determination method according to another exemplary embodiment of the present invention.

FIG. 6 is a flowchart showing a terminal-position determination method according to another exemplary embodiment of the present invention.

FIG. 7 illustrates a resource allocation method according to an exemplary embodiment of the present invention.

FIG. 8 is a flowchart showing a whispering resource request increase solution method for solving a whispering resource request increase by allocating some dialog resources to a whispering-area terminal according to an exemplary embodiment of the present invention.

FIG. 9 is a flowchart showing a whispering resource request increase solution method for solving a whispering resource request increase by increasing a whispering resource ratio according to an exemplary embodiment of the present invention.

FIG. 10 is a flowchart showing a whispering resource request increase solution method for solving a whispering resource request increase by narrowing a range of a dialog resource allocation area according to an exemplary embodiment of the present invention.

FIG. 11 is a flowchart showing a whispering resource request increase solution method for solving a whispering resource request increase by narrowing a range of a dialog resource allocation area according to another exemplary embodiment of the present invention.

FIG. 12 is a flowchart showing a whispering resource request increase solution method for solving a whispering resource request increase by increasing a dialog resource ratio according to an exemplary embodiment of the present invention.

FIG. 13 is a schematic view showing a new resource area generation method according to an exemplary embodiment of the present invention.

FIG. 14 is a flowchart showing a communication resource allocation method in a case that there is no resource area to be allocated to a whispering area according to an exemplary embodiment of the present invention.

FIG. 15 shows that a communication resource allocation method of a 3-sector multi-cell environment according to an exemplary embodiment of the present invention is equal to a communication resource allocation method of an omni-cell environment.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

Hereinafter, frequency, time, and code or the like used to perform a communication between the terminal and the base station is referred to as "a communication resource".

Considering a propagation environment, the base station-peripheral area is referred to as "whispering area" and the cell-border area is referred to as "dialog area". A whispering and dialog area division method will be described behind. Also, a resource that the base station allocates to the whispering area is referred to as a "whispering resource", and a resource that the base station allocates to the dialog area is referred to as a "speaking resource". The whispering and dialog resources are included in the communication resource.

When it is described that the base station allocates a communication resource to the specified area, the base station may allocate resources for transmitting data to the terminal of the specified area, and simultaneously or alternately, the specified terminal may allocate resources for transmitting data to the base station of the specified area.

Now a communication resource allocation method for allocating a communication resource to a cell according to various exemplary embodiments of the present invention will be described with reference to FIG. 1 to FIG. 3. Referring FIG. 1 to FIG. 3, the resource areas are divided in geometrical positions. However, the resource areas may be actually divided according to propagation environments including a blanket area.

FIG. 1 is a schematic view of a cell having an allocated communication resource according to an exemplary embodiment of the present invention.

As shown in FIG. 1, the communication resources are divided into seven areas 1 to 7. In FIG. 1, the communication resources are consecutively and uniformly divided. However, they may not be consecutively divided or uniformly divided. In addition, an n-th resource that the base station allocates to the whispering area is indicated as Wn, and an n-th resource that the base station allocates to the dialog area is indicated as Sn.

The first to seventh base stations 11 to 17 respectively allocate a first resource 1, a second resource 2, a third resource 3, a fourth resource 4, a fifth resource 5, a sixth resource 6, and a seventh resource 7 to the terminal of the whispering area. Focusing on the first base station 11, it allocates the first resource 1 as a whispering resource W1 to the terminal of a whispering area 21 that surrounds the first base station 11 and allocates the second to seventh resources 2 to 7 as remaining resources to the terminal of the speaking area. Particularly, the first base station 11 allocates the second resource 2 as a speaking resource S2 to the terminal of a speaking area 22, the second resource 2 is used as a whispering resource W2 by the second base station 12, and the speaking area 22 is a border area of the second base station 12. Likewise, the second base station 12 allocates the first resource 1 as a speaking resource S1 to the terminal of a speaking area 23, the first resource 1 is used as a whispering resource W1 by the first base station 11, and the speaking area 23 is a border area of the first base station 11.

A wireless communication method between the base station and the terminal in uplink and downlink will now be described. In uplink, when the terminal of the whispering area 21 is communicated with the first base station 11, it has interference with the terminal using the speaking resource S, which is exterior to the cell covered by the first base station 11. However, since the terminal of the whispering area 21 is positioned peripheral to the first base station 11, it may be communicated with the first base station 11. Meanwhile, when the terminal of the speaking area 22 is communicated with the first base station 11, it has interference with the terminals of a whispering area 24. However, the terminal of the speaking area 22 is positioned nearer the first base station 11 than the terminal of the whispering area 24, so that it may be communicated with the first base station 11.

In downlink, the base station may transmit low-power data to the terminal of the whispering area 21, and accordingly, the base station may have little interference with the terminal of the speaking area 23. In addition, although the base station transmits a high-power data to the terminal of the speaking area 22, the base station may have little interference with the terminal using the second recourse 2 of the outside cell.

It is one example that the communication resources are allocated to the terminal while being divided into 7 in FIG. 1. Accordingly, when the cell is not a hexagonal shape but is an irregular shape, the communication resources may be allocated to the terminal while being divided into a number greater than 7.

FIG. 2 is a schematic view of a cell having an allocated communication resource according to another exemplary embodiment of the present invention.

As shown in FIG. 2, the communication resources are divided into three areas 1 to 3. The first to seventh base stations 11 to 17 respectively allocate a first resource 1, a second resource 2, a third resource 3, the second resource 2, the third resource 3, the second resource 2, and the third resource 3 to the terminals of the whispering areas.

Focusing on the first base station 11 as FIG. 1, it allocates the first resource 1 as a whispering resource W1 to the terminal of a whispering area 31 and allocates the second and third resources 2 and 3 to the terminal as the speaking resources. Particularly, the first base station 11 allocates the second resource 2 that the second base station 12 uses as the whispering resource W2 to the terminal of the speaking area 32 of the border area of the second base station 12 as the speaking resource S2.

FIG. 3 is a schematic view of a cell having an allocated communication resource according to another exemplary embodiment of the present invention.

As shown in FIG. 3, the communication resources are divided into four areas 1 to 4. The first to seventh base stations 11 to 17 respectively allocate a first resource 1, a second resource 2, a third resource 3, a fourth resource 4, the second resource 2, the third resource 3, and the fourth resource 4 to the terminals of the whispering areas.

Focusing on the first base station 11 as FIG. 1, it allocates the first resource 1 as a whispering resource W1 to the terminal of a whispering area 41, and allocates the remaining second to fourth resources 2 to 4 to the terminals as the speaking resources. Particularly, the first base station 11 allocates the second resource 2 as the speaking resource S2 to the terminal of a speaking area 42, the second resource 2 is used as the whispering resource W2 by the second base station 12, and the speaking area 42 is a border area with the second base station 12.

As shown in FIG. 1 to FIG. 3, according to an exemplary embodiment of the present invention, the base station may divide a communication resource into 3 or more, and it allocates one thereof to the base station-peripheral terminal and allocates the remaining resources to the cell-border terminal. Particularly, the base station allocates a whispering resource of the adjacent cells to the cell-border terminal of the adjacent cell.

How to determine where the terminal is positioned will be described with reference to FIG. 4 to FIG. 6.

FIG. 4 is a flowchart showing a terminal-position determination method according to an exemplary embodiment of the present invention. For convenience of description of the flowchart shown in FIG. 4, FIG. 1 will be referred to.

First, the terminal calculates a path loss value from the first base station 11 through a pilot signal transmitted from the first base station 11 (S101).

The next terminal calculates a path loss value from the second base station 12 through a pilot signal transmitted from the second base station 12 (S102).

The terminal then transmits the respective path loss values from the first and second base stations 11 and 12 to the first base station 11 (S103).

The first base station 11 receives the path loss values and calculates a path loss difference value which is a difference between the respective path loss information from the first and second base stations 11 and 12 (S104).

When the path loss difference value is greater than a threshold value defined by the system design, the first base station 11 determines that the terminal is included in the whispering area 21 (S105) and allocates the whispering resource to the terminal (S106).

Meanwhile, when the path loss difference value is less than the threshold value defined by the system design, the first base station 11 determines that the terminal is positioned near the speaking area 21 (S105) and allocates the speaking resource to the terminal (S107).

How to determine where the terminal is placed was described above. However, while the terminal may provide the respective path loss values from the adjacent plurality of base stations 11 to 17 to the first base station 11, the first base station 11 may receive the same and determine where the terminal is provided in a cell.

FIG. 5 is a flowchart showing a terminal-position determination method according to another exemplary embodiment of the present invention.

First, the terminal calculates a path loss value from the first base station 11 through a pilot signal transmitted from the first base station 11 (S201).

The next terminal calculates a path loss value from the second base station 12 through a pilot signal transmitted from the second base station 12 (S202).

The first base station 11 then calculates a path loss difference value which is a different between the respective path loss information from the first and second base stations 11 and 12 (S203) and transmits the same to the first base station 11 (S204).

When the path loss difference value is greater than a threshold value defined by the system design, the first base station 11 determines that the terminal is positioned in the whispering area 21 (S205) and allocates the whispering resource to the terminal (S206).

Meanwhile, when the path loss difference value is less than the threshold value defined by the system design, the first base station 11 determines that the terminal is positioned near the speaking area 21 (S205) and allocates the speaking resource to the terminal (S207).

FIG. 6 is a flowchart showing a terminal-position determination method according to another exemplary embodiment of the present invention. Referring to FIG. 6, the base station determines the terminal position as an absolute path loss value between the base station and the terminal.

In order to determine a terminal position, the terminal calculates a path loss value from the first base station 11 through a pilot signal transmitted from the first base station 11 (S301).

Next, the terminal transmits the path loss value of from the first base station 11 to the first base station 11 (S302).

When the path loss difference value is less than a threshold value defined by the system design, a position of the first base station 11 is determined as the whispering speaking area 21 (S303), and the whispering resource is allocated to the terminal (S304).

When the path loss difference value is greater than the threshold value defined by the system design, the first base station 11 determines that the terminal is posited in the speaking area 22 (S303) and allocates the whispering resource to the terminal (S305).

It is one example that the first base station 11 determines the terminal position as the path loss value from the first base station 11 to the terminal in FIG. 6. Accordingly, the first base station 11 may determine the terminal position as the path loss value from the second base station 12 to the terminal. That is, the terminal calculates the path loss value from the second base station 12 and transmits the same to the first base station, and the first base station 11 determines that the terminal is positioned in the whispering area 21 when the path loss difference value is greater than a predetermined value defined by the system design. When the path loss difference value is less than the pre-determined value defined by the system design, the first base station 11 determines that the terminal is positioned in the speaking area 21.

As shown in FIG. 4 to FIG. 6, according to an exemplary embodiment of the present invention, the base station may determine the terminal position based on propagation environments in various manners. That is, the base station may determine where the terminal is in the whispering area or speaking area using the path loss difference value, and may determine the terminal position using the absolute path loss value. Also, the base station may determine the terminal position using a plurality of path loss values corresponding to a difference from the plurality of base stations to the terminal.

Next, a recourse allocation method according to various exemplary embodiments of the present invention will be described with reference to FIG. 7 to FIG. 15.

FIG. 7 illustrates a resource allocation method according to an exemplary embodiment of the present invention. Particularly, FIG. 7 shows the resource allocation method in the cell in which the resources are allocated, as in FIG. 3.

That is, the whispering resource W1 and the speaking resources S2 to S4 of the first base station 11 have a resource area changed according to a lapse of time.

In FIG. 7, the first base station 11 uses the first resource as the whispering resource W1 in a range of 0 to T seconds, uses the second resource as the whispering resource W1 in a range of T to 2 T seconds, uses the third resource as the whispering resource W1 in a range of 2 T to 3 T seconds, and uses the fourth resource as the whispering resource W1 in a range of 3 T to 4 T seconds. The first base station 11 may change the speaking resource area with the lapse of time. Since the first base station 11 sequentially allocates the first and fourth resource areas to the whispering area 41 according to a lapse of time, the second base station 12 sequentially allocates the first and fourth resource areas to the speaking area 43 in response to the allocation thereof.

If the first base station 11 uses the whispering resource W1 and speaking resources S2 to S4 as the fixed allocation method as in range of 0 to T seconds, the first base station 11 or terminal must have a limited diversity gain. That is, the terminal using the whispering resource W1 may obtain a diversity gain only in the first resource area.

However, when the resource allocation method shown as FIG. 7 is used, the first base station 11 or the terminal using the whispering resource W1 may obtain a diversity gain in all communication resources (i.e., the first to fourth resource areas). In addition, the first base station 11 or the terminal using the speaking resources S2 to S4 may obtain a diversity gain in all communication resources (i.e., the first to fourth resource areas).

Next, a method for solving a resource request imbalance between the whispering and speaking areas will be described. FIG. 1 is referred to.

First, a whispering resource request increase solution method for solving a resource request increase in the whispering area 21 will be described with reference to FIG. 8 and FIG. 9. When it is described that the resource request is increased, traffic to be transmitted or to be received may be increased. Particularly, it is problematic when a resource request amount of the whispering area 21 is greater than the whispering resource W1 in the case of the resource request increase of the whispering area 21.

A first method used in the case that the request resource amount of the whispering area 21 is greater than the whispering resource W1 may include allocating some speaking resources to the terminal of the whispering area 21. This method will be described with reference to FIG. 8.

FIG. 8 is a flowchart showing a whispering resource request increase solution method for solving a whispering resource request increase by allocating some dialog resources to a whispering-area terminal according to an exemplary embodiment of the present invention.

First, the first base station 11 allocates the whispering resource W1 as a part of the communication resource to the whispering area 21, in which the whispering area 21 is a peripheral area of the first base station 11 (S401), and allocates the speaking resource S2 corresponding to the whispering resource of the second base station 12 to the speaking area 22, in which the speaking area 22 is covered by the first base station 11 and a border area of with the second base station 12 (S402). At this time, the first base station 11 divides the cell area into the whispering area 21 and the speaking area 22 according to the propagation environment information. The first base station 11 may divide the cell area into the whispering area 21 and speaking area 22 as in FIG. 4 to FIG. 6.

Then, when the first base station 11 determines that the request resource amount of the whispering area 21 is greater than the first resource 1 (S403), the first base station 11 further allocates a part of the second resource 2 to the whispering area 21 (S404).

Next, the case in which the first base station 11 further allocates the part of a second resource 2 to the whispering area 21 as shown in FIG. 8 will be described while dividing into downlink and uplink. Referring to downlink, when the first base station has a lot of data to be transmitted to the whispering area 21, it transmits the data to the terminal of the whispering area 21 using the part of the second resource 2. Since the first base station 11 uses the second resource as a power for transmitting the data to the entire cell in downlink, it is not problematic that the first base station 11 transmits the data to the terminal of the whispering area 21 nearer than the speaking area 22 using the speaking resource S2. Referring to uplink, it is not problematic that the terminal of the whispering area 21 transmits the data to the first base station 11 using the speaking resource S2 because the cell covered by the first base station 11 has little interference with outside cells thereof.

A second method used in the case that the request resource amount of the whispering area 21 is greater than the whispering resource W1 may include increasing a ratio of the whispering resource W1. This method will be described with reference to FIG. 9.

FIG. 9 is a flowchart showing a whispering resource request increase solution method for solving a whispering resource request increase by increasing a whispering resource ratio according to an exemplary embodiment of the present invention.

First, the first base station 11 allocates the whispering resource W1 as a part of the communication resource to the whispering area 21 (S501), and allocates the speaking resource S2 corresponding to the whispering resource of the second base station 12 to the speaking area 22 (S502).

Then, when the first base station 11 determines that the request resource amount of the whispering area 21 is greater than the first resource 1 (S503), the first base station 11 increases a ratio of the first resource 1, that is, the whispering resource (S504).

Since the communication resource amount that the first base station 11 may allocate is limited, the first base station 11 decreases ratios of other resources by the increase of the ratio of the first resource 1 (S505). For example, when the first base station 11 determines that the resource request amount of the speaking area 22 is less than the amount of the second resource 2, the ratio of the second resource 2 is decreased. The first base station 11 decreases a ratio of the one of the second to seventh resources 2 to 7 and accordingly it may guarantee the increment of the first resource 1 as the whispering resource, and decreases the ratios of two or more of the second and seventh resources 2 to 7 and accordingly it may guarantee the increment of the first resource 1 as the whispering resource.

Assuming that the first base station 11 uniformly divides the communication resource into 7 and uses one thereof, in case that the request resource amount of the whispering area 21 is greater than the whispering resource W1, the first base station 11 increases the ratio of the whispering resource W1 by 1/14 and decreases the ratio of the speaking resource S2 by 1/14. When the ratio of the whispering resource W1 is increased and the ratio of the speaking resource S2 is decreased, the interference to the outside cells may not be increased. Accordingly, it is not problematic that the first base station 11 uses the method of FIG. 9.

Next, a method for solving that the resource request amount of the speaking area 22 is greater than the speaking resource S2 will be described with reference to FIG. 10 and FIG. 12.

FIG. 10 is a flowchart showing a whispering resource request increase solution method for solving a whispering resource request increase by narrowing a range of dialog resource allocation area according to an exemplary embodiment of the present invention. FIG. 1 is referred to so as to explain FIG. 10.

First, the first base station 11 obtains a path loss difference value, which is a difference between the respective path loss values from the first and second base stations 11 and 12 to the terminal (S601).

Next, the first base station 11 performs a communication resource allocation to the first base station-covering area (S602). That is, the first base station 11 allocates the first resource 1 to the whispering area 21 in which the path loss difference value is greater than a predetermined threshold value. The first base station 11 allocates the second resource 2 to the speaking area 22 in which the path loss difference value is less than the predetermined threshold value. The second resource 2 is used as the whispering resource by the second base station 12.

When the first base station 11 determines that the request resource amount of the speaking area 22 is greater than that of the second resource 2 (S603), the first base station 11 decreases the threshold value (S604). The local range of the speaking area 22 then becomes narrower and the local range of the whispering area 21 becomes wider. In this case, some terminals placed in the speaking area 22 are incorporated into the whispering area 21 and accordingly the request resource of the speaking area 22 is decreased by the incorporated amount.

A few processes may be needed for the terminal incorporated from the speaking area 22 to the whispering area 21.

In downlink, it is necessary that the first base station 11 performs adaptive modulation and coding with respect to the terminal incorporated from the speaking area 22 to the whispering area 21 (S605). In downlink, the first base station 11 applies a lower power to the whispering resource than to the speaking resource. Since the terminal incorporated from the speaking area 22 to the whispering area 21 is at a position in which the path loss from the first base station 11 is greater due to the decreases of the threshold value, an error probability on the reception of data may be increased. In this case, when the first base station 11 applies a higher power to the whispering resource than previously, it is problematic that the adjacent cells have more interference. Accordingly, the first base station 11 performs the adaptive modulation and coding (AMC) with respect to the terminal incorporated from the speaking area 22 to the whispering area 21 according to the decrease of the threshold value. That is, the first base station 11 transmits the data to the corresponding terminal while it changes a modulation method or encoding method applied to the terminal incorporated from the speaking area 22 to the whispering area 21 according to the decrease of the threshold value, and accordingly, the error rate may be decreased For example, the first base station 11 transmits the data to the terminal through the 16-QAM (Quadrature Amplitude Modulation), which is a modulation method having a lower error rate than the 64-QAM applied to the terminal incorporated from the speaking area 22 to the whispering area 21 after the decrease of the threshold value while the first base station 11 transmits the data to the terminal through the 64-QAM before the decrease of the threshold value.

In uplink, it is required that the first base station 11 controls the terminal such that a transmit power of the terminal incorporated from the speaking area 22 to the whispering area 21 is decreased (S606), or that the first base station 11 provides the threshold value decrease information to the adjacent base station (S607). The terminal incorporated from the speaking area 22 to the whispering area 21 is positioned in the border area of the first base station 11, and it uses the whispering resource so as to communicate with the first base station 11. Accordingly, when the terminal incorporated from the speaking area 22 to the whispering area 21 communicates with the first base station 11 through the whispering resource, it is problematic in that it has interference with the adjacent cells. In order to solve such a problem, the first base station 11 controls the terminal such that the transmit power of the terminal incorporated from the speaking area 22 to the whispering area 21 is decreased (S606). Also, the first base station 11 provides the threshold value decrease information to the adjacent base stations (S607) so that the adjacent base station uses the adaptive modulation and coding using the threshold value decrease information of the first base station 11.

FIG. 11 is a flowchart showing a whispering resource request increase solution method for solving a whispering resource request increase by narrowing a range of a dialog resource allocation area according to another exemplary embodiment of the present invention. FIG. 1 is referred to so as to explain FIG. 10.

The method shown in FIG. 11 includes reducing a necessary resource amount of the speaking area 22 by incorporating some terminals of the speaking area 22 into the speaking area 25 when the request resource amount of the speaking area 22 is greater than the second resource 2

First, the first base station 11 obtains a first path loss difference value (hereinafter, C1), which is a difference between the respective path loss information from the first and second base stations 11 and 12 to the terminal. The first base station 11 obtains a second path loss difference value (hereinafter, C2), which is a difference between the respective path loss information from the first and third base stations 11 and 13 to the terminal. The first base station 11 obtains a third path loss difference value (hereinafter, C3), which is a difference between the respective path loss information from the second and third base stations 12 and 13 to the terminal (S701).

Next, the first base station 11 performs communication resource allocation to the first base station-covering area (S702). That is, the first base station 11 allocates the first resource 1 as the whispering resource to the whispering area 21 in which the C1 is greater than a predetermined first threshold value (hereinafter, TH1) and the C2 is greater than a predetermined second threshold value (hereinafter, TH2). The first base station 11 allocates the second resource 2 as the speaking resource to the speaking area 22 in which the C1 is less than the predetermined first threshold value (hereinafter, TH1) and the C3 is greater than a predetermined third threshold value (hereinafter, TH3). The first base station 11 allocates the third resource 3 as the speaking resource to the speaking area 25 in which the C2 is less than the first threshold value TH1 and the C3 is less than the third threshold value TH3.

Then, the first base station 11 determines that the request resource amount of the speaking area 22 is greater than that of the second resource 2 (S703), and increases the TH3 (S704). The local range of the speaking area 22 becomes narrower and the local range of the speaking area 25 becomes wider. In this case, since the terminal using the second resource 2 uses the third resource 3, the request resource amount of the speaking area 22 is decreased by the use amount of the third resource 3.

A few processes may be needed for the terminal incorporated from the speaking area 22 to the speaking area 25.

That is, the terminal incorporated from the speaking area 22 to the speaking area 25 may have a low successfully received data rate though the third resource 3 in comparison with the terminal of the original speaking area 25. Accordingly, the first base station 11 may perform adaptive modulation and coding to the terminal incorporated from the speaking area 22 to the speaking area 25 (S705).

Meanwhile, the terminal incorporated from the speaking area 22 to the speaking area 25 is positioned in the border area of the second base station-covering cell and it uses the third resource 3, and accordingly it has interference with the terminals using the third resource 3 in the second base station-covering cell. Accordingly, the first base station 11 controls the corresponding terminal such that the transmit power of the terminal incorporated from the speaking area 22 to the speaking area 25 is decreased (S706), and provides the TH3 increase information to the second base station 12 so that the second base station 12 may use the TH3 increase information for the adaptive modulation and coding (S707).

FIG. 12 is a flowchart showing a whispering resource request increase solution method for solving a whispering resource request increase by increasing a dialog resource ratio according to an exemplary embodiment of the present invention. FIG. 1 is referred to so as to explain FIG. 12.

First, the first base station 11 allocates the whispering resource W1 as a part of a communication resource to the whispering area 21 (S801), and allocates the corresponding speaking resource S2 to the whispering resource of the second base station 12 to the speaking area 22 (S802).

Then, when the first base station 11 determines that the request resource amount of the speaking area 22 is greater than that of the speaking resource S2 (S803), it decreases a ratio of the speaking resource S3 that the third base station 13 uses as the whispering resource (S804) and increases the ratio of the speaking resource S2 by the decrease amount (S805). At this time, it is preferable that the ratio of the whispering resource W3 of the third base station 13 is not decreased.

The first base station 11 requests to the second base station 12 such that the ratio increase of the second resource 2 is reflected on the whispering resource of the second base station 12 (S806).

Next, the case in which there is no resource area for the specified base station to allocate as the whispering resource because the base stations of the adjacent cells have allocated all resource areas to the respective whispering areas will be described. In this case, a method for using a newly generated resource area as a whispering resource will be described with reference to FIG. 13.

FIG. 13 is a schematic view showing a new resource area generation method according to an exemplary embodiment of the present invention.

As shown in FIG. 13, the communication resource is divided into a first resource area, a second resource area, a third resource area, and a fourth resource area. At this time, the new resource area may be made by gathering parts of at least two or more resource areas among the first resource area, the second resource area, the third resource area, and the fourth resource area.

When the base station uses the new resource area generated in this manner as the whispering resource, the new resource area may be partly overlapped with the other resource areas. However, the base station may allocate a predetermined resource to the terminal of the whispering area even though there is no resource area to be allocated as the whispering resource.

A communication resource allocation method in the case that there is no resource area to be allocated as the whispering resource will be described with reference to FIG. 1 and FIG. 14.

FIG. 14 is a flowchart showing a communication resource allocation method in the case that there is no resource area to be allocated to a whispering area in an exemplary embodiment of the present invention.

First, the first base station 11 collects the path loss value between at least one base station and the terminal during a predetermined time by receiving the same from the terminal (S901).

The first base station 11 determines the adjacent base station (for convenience of description, it is given as the second base station of FIG. 1) through the collected path loss value (S902).

Then, the first base station 11 obtains a path loss difference value, which is a difference between the path loss information between the first base station 1 and the terminal and between the second base station 12 and the terminal (S903).

The first base station 11 allocates the second resource 2 corresponding to the whispering resource of the second base station to the terminal of the speaking area 22, in which the path loss difference value is less than the predetermined threshold value (S904). The first base station 11 allocates the resource corresponding to the whispering resource of the corresponding adjacent base station to the border area with all the adjacent base stations determined by the step (S902).

Next, the first base station 11 determines whether there is a remaining resource area after allocating resources to all the speaking areas at the step (S904) (S905). If there is, all or a part of the remaining resource area may be allocated to the terminal of the whispering area (S906). If there are no remaining resources, the first base station 11 configures a new resource area like in FIG. 13 (S907), and allocates the configured new resource area to the terminal of the whispering area (S908).

The communication resource method of the omni-cell environment has been described above. However, the communication resource method of a 3-sector multi-cell environment is similar to the communication resource method of the omni-cell environment. It will be described with reference to FIG. 15.

FIG. 15 shows that a communication resource allocation method of a 3-sector multi-cell environment according to an exemplary embodiment of the present invention is to the same as a communication resource allocation method of an omni-cell environment.

As shown in FIG. 15, one sector has 6 adjacent sectors, and accordingly the base station may allocate one whispering resource and at least one speaking resource to one sector. That is, the one sector of FIG. 15 wholly corresponds to the one cell of FIG. 1.

The recording medium may include all types of recording medium that a computer can read, for example an HDD, a memory, a CD-ROM, a magnetic tape, and a floppy disk, and it may also be realized in a carrier wave (e.g., Internet communication) format.

INDUSTRIAL APPLICABILITY

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, a terminal in a cell may obtain a diversity gain over the entire range of the communication resources by the base station allocating resources, in which the resource areas of various areas in the cell are changed according to the time.

Also, according to an exemplary embodiment of the present invention, the base station may settle an imbalance of resource request between the whispering area and the speaking area.

In addition, according to an exemplary embodiment of the present invention, the base station may allocate the resource to the whispering area by making new resource areas even when there is no resource area to be allocated to the whispering area.

The invention claimed is:

1. A communication resource allocation method in which a base station allocates a communication resource, comprising:
    allocating a whispering resource to a whispering area, the whispering area being a peripheral area of the base station and the whispering resource having a resource area changed within the communication resource with a lapse of time; and
    allocating a plurality of speaking resources to a plurality of speaking areas, respectively,
    wherein the plurality of speaking areas belong to the base station,
    wherein the plurality of speaking areas correspond to a plurality of neighboring base stations, respectively,
    wherein each of the plurality of speaking areas is a border area between the base station and a corresponding neighboring base station,
    wherein each of the plurality of speaking resources corresponds to a whispering resource of a corresponding neighboring base station,
    wherein the plurality of whispering resources have a resource area changed within the communication resource with the lapse of time,
    where the communication resource allocation method further comprises obtaining a path loss difference value, the path loss difference value being a difference between first and second path loss values which are respectively given between the base station and a terminal and between one neighboring base station and the terminal;
    determining the terminal-including area as the whispering area when the path loss difference value is greater than a predetermined threshold value; and
    determining the terminal-including area as a speaking area corresponding to the one neighboring base station when the path loss difference value is less than the predetermined threshold value.

2. The communication resource allocation method of claim 1, wherein obtaining the path loss difference value comprises
    receiving the first and second path loss values from the terminal, and
    calculating the path loss difference value which is the difference between the first and second path loss values.

3. The communication resource allocation method of claim 1, wherein obtaining the path loss difference value comprises receiving the path loss difference value from the terminal.

4. A communication resource allocation method in which a base station allocates a communication resource, comprising:
    allocating a whispering resource to a whispering area, the whispering area being a peripheral area of the base station and the whispering resource having a resource area changed within the communication resource with a lapse of time; and
    allocating a plurality of speaking resources to a plurality of speaking areas, respectively,
    wherein the plurality of speaking areas belong to the base station,
    wherein the plurality of speaking areas correspond to a plurality of neighboring base stations, respectively,
    wherein each of the plurality of speaking areas is a border area between the base station and a corresponding neighboring base station,
    wherein each of the plurality of speaking resources corresponds to a whispering resource of a corresponding neighboring base station,
    wherein the plurality of whispering resources have a resource area changed within the communication resource with the lapse of time,
    wherein the communication resource allocation method further comprises:
    obtaining a path loss value between the base station and a terminal;
    determining the terminal-including area as the whispering area when the path loss value is less than a predetermined threshold value; and
    determining the terminal-including area as a speaking area when the path loss value is greater than the predetermined threshold value.

5. A communication resource allocation method in which a base station allocates a communication resource, comprising:
    allocating a whispering resource to a whispering area, the whispering area being a peripheral area of the base station and the whispering resource having a resource area changed within the communication resource with a lapse of time; and
    allocating a plurality of speaking resources to a plurality of speaking areas, respectively,
    wherein the plurality of speaking areas belong to the base station,
    wherein the plurality of speaking areas correspond to a plurality of neighboring base stations, respectively,
    wherein each of the plurality of speaking areas is a border area between the base station and a corresponding neighboring base station,
    wherein each of the plurality of speaking resources corresponds to a whispering resource of a corresponding neighboring base station,
    wherein the plurality of whispering resources have a resource area changed within the communication resource with the lapse of time,
    wherein the communication resource allocation method further comprises
    obtaining a path loss value between one neighboring base station and a terminal;
    determining the terminal-including area as the whispering area when the path loss value is greater than a predetermined threshold value; and
    determining the terminal-including area as a speaking area corresponding to the one neighboring base station when the path loss value is less than the predetermined threshold value.

* * * * *